H. COLL.

Ejector.

No. 8,904. Reissued Sept. 23, 1879.

Witnesses.

James K. Bakewell.

Geo. C. Fitter

Inventor.

Hugh Coll by Bakewell & Kerr

Attorneys

THE NORRIS PETERS CO., PHOTO-LITHO., WASHINGTON, D. C.

UNITED STATES PATENT OFFICE.

HUGH COLL, OF BLACK HAWK P. O., PENNSYLVANIA.

IMPROVEMENT IN EJECTORS.

Specification forming part of Letters Patent No. 110,205, dated December 20, 1870; Reissue No. 8,904, dated September 23, 1879; application filed August 30, 1879.

*To all whom it may concern:*

Be it known that I, HUGH COLL, of Black Hawk P. O., in the county of Beaver and State of Pennsylvania, have invented a new and useful Improvement in Ejectors; and I do hereby declare the following to be a full, clear, and exact description thereof, reference being had to the accompanying drawings, making a part of this specification, in which—

Figure 1:
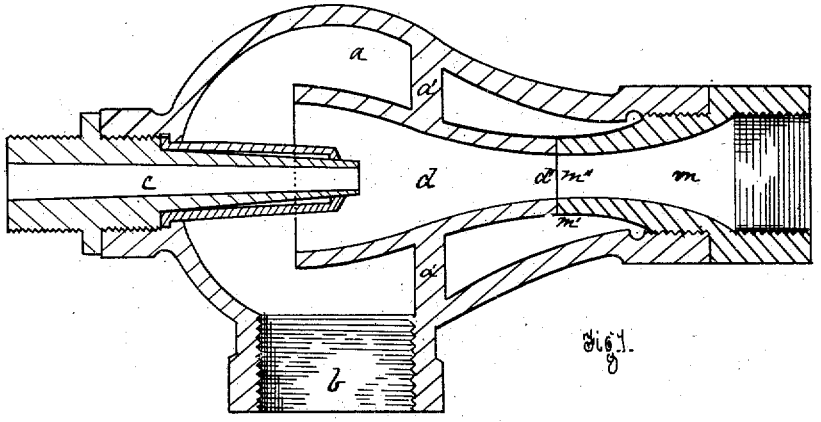
Figure 2:
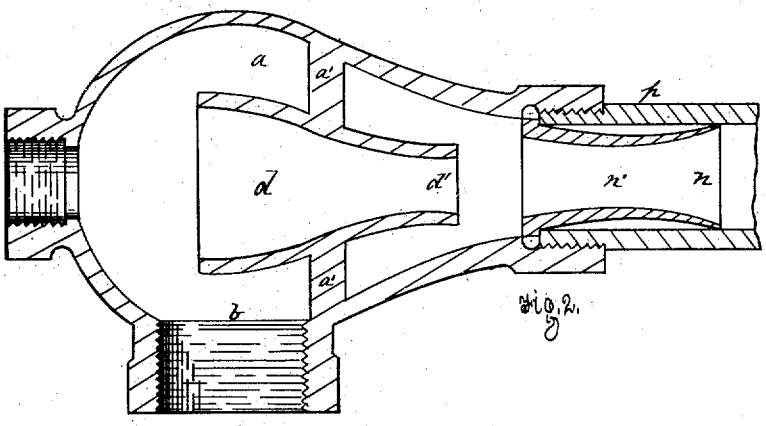
Figure 3:
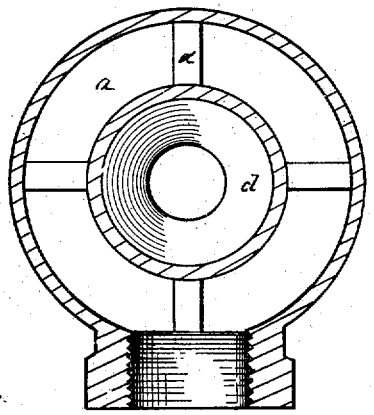

Figure 1 is a longitudinal vertical section of my improved pump; Fig. 2, by a like view, shows a modification thereof; and Fig. 3 is a vertical transverse section through *x x*, Fig. 1.

Like letters of reference indicate like parts in each.

My present invention relates to certain improvements in the siphon-pump patented to me June 8, 1869; and consists in modifications of form and construction, whereby such pump is adapted to new uses, or to accomplish old results in a better manner.

To enable others skilled in the art to make and use my improvement, I will proceed to describe its construction and mode of operation.

The outer head, *a*, is of the usual construction, and has the usual water-inlet opening *b* and an opening for the insertion of the steam-injection pipe *c*.

The base or blunt end of the inner head of the original patent above referred to is cut off at or near the broadest part, so as to give a head or shell, *d*, open at the base, and with a bore diminishing toward its forward end, *d'*. This head *d* is connected, in casting, to the outer head, *a*, by means of radial arms *a'*, in any desired number.

The inner head, *d*, having a large unobstructed opening at its base, I have devised more particularly for use in pumping or ejecting bilge-water, the water out of tan-vats, &c. As some tan-bark is necessarily carried up with the water, the holes or passages for the water are apt to become clogged, unless ample room be left for the flow of both. I thus adapt the double head to the uses described.

I have also effected further improvements by the construction of nozzle-pieces which are interchangeable, and may be used with the same pump, according to the varying conditions under which the water is to be raised.

The nozzle-piece *m*, Fig. 1, is designed for use in raising water to a considerable height with a comparatively small amount of steam. This nozzle-piece, at its rear end, *m'*, abuts against, or is connected with, the forward end, *d'*, of the inner head or tube, *d*, forming substantially an extension thereof, so as to give a smooth joint inside and least resistance to the flow of water. At its throat *m''* it is contracted somewhat, from which it opens into a larger pipe.

Another form of nozzle-piece, *n*, is shown in Fig. 2, in which the size of the throat *n'* is reduced, and which does not abut against the end of the inner pipe, *d'*, but leaves a space between it and the inner pipe, *d'*, so that a flow of water can be kept up from the space between the two heads. This form is designed for raising a larger body of water to a less height with the same amount of steam.

The nozzle *n* may be set loosely in the end of the main discharge-pipe *p*, as shown, or otherwise attached at pleasure.

This ejector operates on the same principle as my ejector patented June 8, 1869, does. The jet of steam being surrounded and protected by the inner head or shell, *d*, does not condense so rapidly as in the old form of ejectors, where it came directly in contact with the whole volume of the inflowing water in the outer head. Its force is consequently preserved, and as it operates upon only that portion of water in the narrower limits of the inner head or shell which is directly in its path, great power with a comparatively small amount of steam is obtained.

It will be seen that the forward end of the outer chamber is closed, and that the entire discharge of the pump is through the inner head, *d*.

It will also be seen that the rear open end of the inner head extends nearly across the induction-opening, and acts as a break-water to deflect and turn the water to the back part of the head *a*, and cause it to enter the inner head, *d*, parallel to the jet of steam.

Having thus described my improvement, what I claim, and desire to secure by Letters Patent, is—

1. A water-ejector having an inner head or shell which is open at its rear end, so as to leave an unobstructed opening thereto, and through which all the water discharged from the ejector passes, substantially as and for the purposes described.

2. A water-ejector provided with an inner head, having a large unobstructed opening at its rear end, which extends partially across the induction-opening, substantially as and for the purposes described.

In witness whereof I, the said HUGH COLL, have hereunto set my hand.

HUGH COLL.

Witnesses:

R. H. WHITTLESEY,

JNO. K. SMITH.